United States Patent
Bullman et al.

(10) Patent No.: US 7,876,758 B2
(45) Date of Patent: Jan. 25, 2011

(54) METHOD AND APPARATUS FOR IMPROVED VOICE OVER INTERNET PROTOCOL (VOIP) TRANSMISSION IN A DIGITAL NETWORK

(75) Inventors: William R. Bullman, Macungie, PA (US); Christopher W. Hamilton, Breinigsville, PA (US)

(73) Assignee: Agere Systems Inc., Allentown, PA (US)

( * ) Notice: Subject to any disclaimer, the term of this patent is extended or adjusted under 35 U.S.C. 154(b) by 900 days.

(21) Appl. No.: 11/101,825

(22) Filed: Apr. 8, 2005

(65) Prior Publication Data

US 2006/0227782 A1    Oct. 12, 2006

(51) Int. Cl.
H04L 12/28    (2006.01)
(52) U.S. Cl. ....................... 370/392; 370/401
(58) Field of Classification Search .......... 370/392, 370/401
See application file for complete search history.

(56) References Cited

U.S. PATENT DOCUMENTS

| | | | |
|---|---|---|---|
| 6,581,241 B2 | 6/2003 | Shaver et al. ............... 15/413 |
| 6,622,016 B1* | 9/2003 | Sladek et al. ............. 455/414.1 |
| 2002/0026515 A1* | 2/2002 | Michielsens et al. ........ 709/227 |
| 2002/0159462 A1* | 10/2002 | Demaria et al. .......... 370/395.1 |
| 2003/0051060 A1* | 3/2003 | Vitenberg .................. 709/250 |
| 2003/0126280 A1* | 7/2003 | Yao et al. .................. 709/234 |
| 2004/0228326 A1* | 11/2004 | Pearson .................... 370/352 |
| 2005/0025105 A1* | 2/2005 | Rue ......................... 370/338 |
| 2005/0120208 A1* | 6/2005 | Albert Dobson ........... 713/160 |
| 2005/0182833 A1* | 8/2005 | Duffie et al. .............. 709/224 |
| 2005/0198531 A1* | 9/2005 | Kaniz et al. ............... 713/201 |
| 2006/0002378 A1* | 1/2006 | Beach et al. .............. 370/352 |
| 2006/0013210 A1* | 1/2006 | Bordogna et al. .......... 370/389 |
| 2006/0072722 A1* | 4/2006 | Savoor et al. ........... 379/93.05 |
| 2006/0274706 A1* | 12/2006 | Chen et al. ............... 370/340 |

FOREIGN PATENT DOCUMENTS

| | | |
|---|---|---|
| GB | 2333443 | 7/1999 |
| JP | 6-332 | 1/1994 |

OTHER PUBLICATIONS

Official Action dated Mar. 20, 2006 issued from the Korean Intellectual Property Office with respect to Korean Patent Application No. 2004-100505 filed on Dec. 2, 2004.
British Combined Search and Examination Report dated Aug. 8, 2005 issued to corresponding British Application No. 0511379.0.

* cited by examiner

*Primary Examiner*—Daniel J Ryman
*Assistant Examiner*—John Blanton
(74) *Attorney, Agent, or Firm*—Ryan, Mason & Lewis, LLP

(57) ABSTRACT

Voice services are provided in a network node of a digital networking system. A service signal is provided to at least one user device. One or more voice packets are received from the at least one user device. The one or more voice packets are processed, and transmitted to one or more destinations determined in the packet processing.

23 Claims, 3 Drawing Sheets

METHOD AND APPARATUS FOR IMPROVED VOICE OVER INTERNET PROTOCOL (VOIP) TRANSMISSION IN A DIGITAL NETWORK

FIELD OF THE INVENTION

The present invention relates generally to the field of digital networking systems and, more particularly, to improved techniques for providing voice subscriber service in a digital network.

BACKGROUND OF THE INVENTION

Voice over Internet protocol (VoIP) transmission techniques may be employed in a digital subscriber line access multiplexer (DSLAM) network. A DSLAM network provides a user, at a terminal or other endpoint, with the ability to transmit data to, and receive data from, an upstream source. A DSLAM network is typically designed to accommodate a variety of different types of data channels, such as, for example, a number of video channels as well as channels associated with user data, voice and gaming traffic. The endpoints of a DSLAM platform commonly access the network through modems, or gateways, at a residence or business. Endpoint devices may include, for example, televisions, computers, personal digital assistants (PDAs), telephones or other types of communication terminals. A DSLAM network enables the simultaneous transmission of any of the available channels to and from a user in the network.

VoIP transmission specifically allows for the transmission of voice data, or packets, over the network through the use of a telephone, or similar device, at an endpoint of the DSLAM network. Since the network transmits a variety of different types of user traffic, as described above, the network should be enabled to distinguish the types of traffic from each other and recognize voice data from the other types of data handled by the network. The network should also properly route the voice data to a desired destination. Where these recognition and routing techniques take place in the network, affects the network's communication abilities.

In one conventional technique for VoIP transmission in a network, outgoing voice data is recognized and routed through the processing of the outgoing data in a custom home gateway. This type of approach is utilized by, for example, NTT Communications, Tokyo, Japan (NTT). In processing the voice data, the call is converted into a standard voice call in the custom gateway. This conversion is from the packet switched network, or data network, to the circuit switched network, or plain old telephone service (POTS) network.

However, the custom home gateway approach is a fixed, location dependent approach, which does not allow for customer mobility. Should a subscriber's location change, it would be necessary to download VoIP call set and service parameters (SPs) from the carrier to the handset. This is due to the fact that the recognition and routing techniques take place at individual home gateways. The custom gateway approach also fails to natively detect, prioritize and automatically route voice packets in the carrier network. Further, the NTT attempts are not compatible with standards-based broadband access networks. Finally, since many areas of the world provide networks in which the carrier does not typically own the individual home gateway, such as China, Europe, the Middle East, Africa and North America, such areas would generally not find the custom home gateway useful.

Thus, a need remains for techniques that provide improved recognition and routing of VoIP transmissions in a digital networking system, which enable customer mobility, standards-based broadband access network compatibility, and network carrier and gateway independence.

SUMMARY OF THE INVENTION

The present invention in an illustrative embodiment provides improved voice subscriber service techniques with voice packet processing in a broadband access system.

In accordance with one aspect of the invention, in a network node of a digital networking system, a method of providing voice services is provided. A service signal is provided to at least one user device. One or more voice packets are received from the at least one user device. The one or more voice packets are processed, and transmitted to one or more destinations determined in the processing step.

In another aspect of the invention a service request from the user device is detected at the network node, and forwarded to a registration system of the network node. Service parameters (SPs) may be inspected at the registration system and service may be granted to the user device on the digital networking system. Further, the voice packets and respective Internet protocol headers may be detected and prioritized in the processing of voice packets in the network node.

An integrated circuit in accordance with an embodiment of the present invention, used in a network node of a digital networking system, is capable of granting a service signal to at least one user device, receiving one or more voice packets from the at least one user device at the network node, processing the one or more voice packets at the at least one network node, and transmitting the one or more voice packets through the digital networking system to one or more defined destinations.

Advantageously, an illustrative embodiment of the present invention can be added to any broadband access network or other digital networking system through the addition of VoIP classification and traffic management processing at the network nodes. The invention enables mobility across carriers and between locations since detection, recognition and processing of the voice packets take place at the network nodes of the system instead of the individual user gateways, more specifically, user modems. The invention does not require carrier ownership of the gateway and provides a less expensive networking system. The invention also does not require downloading of VoIP call set and service parameters (SPs) from the carrier to the handset when a subscriber location changes.

These and other objects, features, and advantages of the present invention will become apparent from the following detailed description of the illustrative embodiments thereof, which is to be read in connection with the accompanying drawings.

DETAILED DESCRIPTION

As will be described in detail below, the present invention in the illustrative embodiment relates to improved techniques for providing voice subscriber service in a digital network through the recognition and routing of voice packets at a network node of the digital network.

Figure 1:
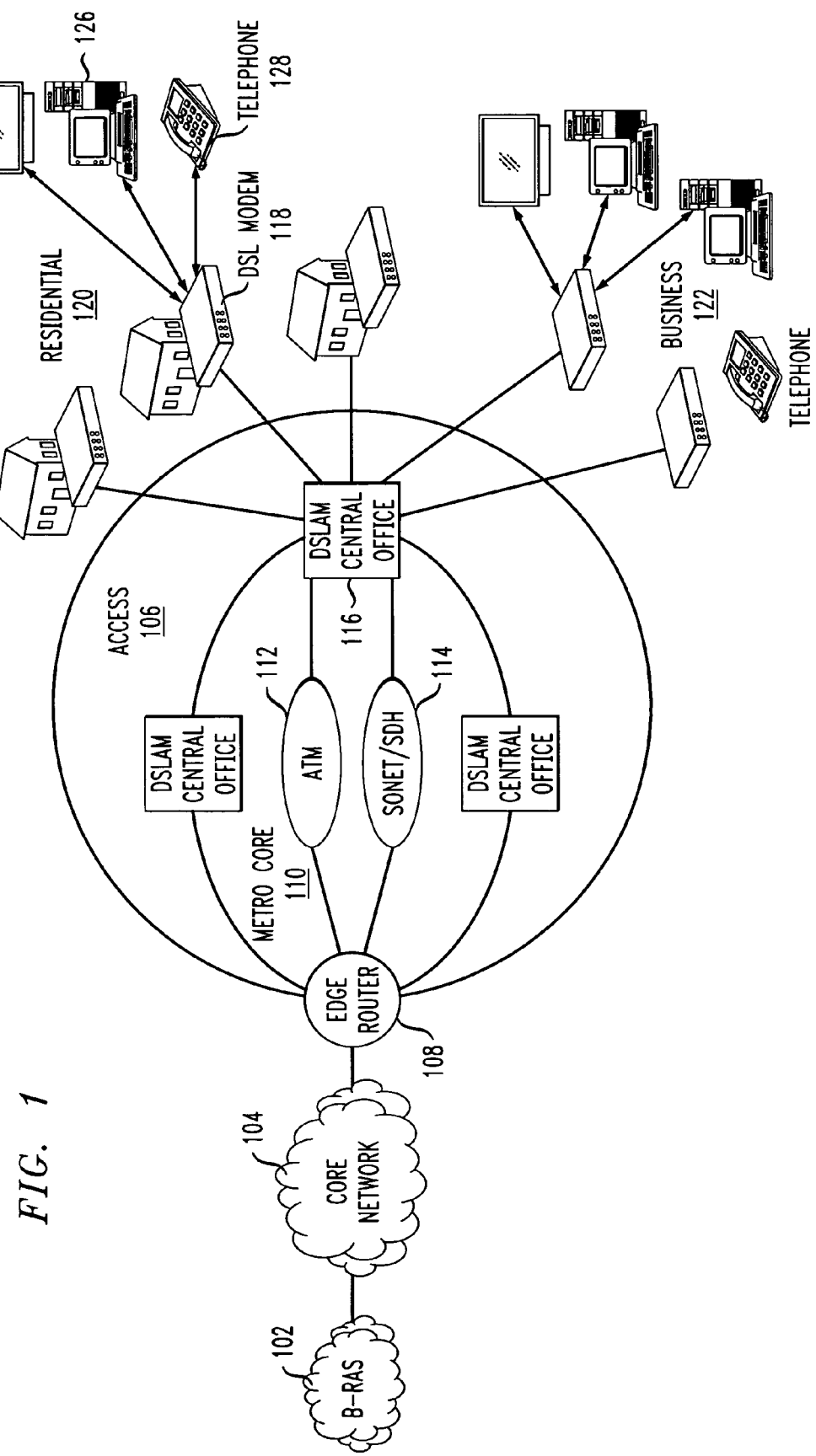
FIG. 1 is a diagram illustrating a DSLAM network, according to an embodiment of the present invention.

Referring initially to FIG. 1, a diagram illustrates a DSLAM network, according to an embodiment of the present invention. Data may be sent from the far end of the network at a broadband remote access server (B-RAS) 102, through a core network 104 and into an access network 106. Core network 104 is in communication with access network 106 through an edge router 108. Edge router 108 may communicate with a central office or network node 116, through a metro core 110 of access network 106 via an asynchronous transfer mode (ATM) 112, synchronous optical network (SONET) or synchronous digital hierarchy (SDH) 114. SONET is the United States version of synchronous data transmission over fiber optic networks, while SDH is the international version of the standard. Examples of network node 116 may include, for example, a digital subscriber line (DSL) aggregation mux, an Ethernet switch, a broadband loop carrier, and an optical networking unit. Edge router 108 may provide communication to and from several DSLAM network nodes through metro core 110 of access network 106. DSLAM network node 116 is in communication with gateways 118, more specifically, modems, at residences 120 and businesses 122 for use, for example, with a television 124, computer 126, or telephone 128.

Regarding VoIP transmission, a call is originated at telephone 128 having an Internet protocol (IP) set up for communication over the DSLAM network. Telephone 128 transmits a service request into the DSLAM network through modem 118. Once the service request is granted, the telephone then transmits voice packets into the DSLAM network through modem 118. The voice packets are received at network node 116 for recognition and routing. After processing the voice packets at network node 116, the voice packets are distributed through the DSLAM network according to their specified destinations, thereby enabling the transmission of a phone call.

Figure 2:
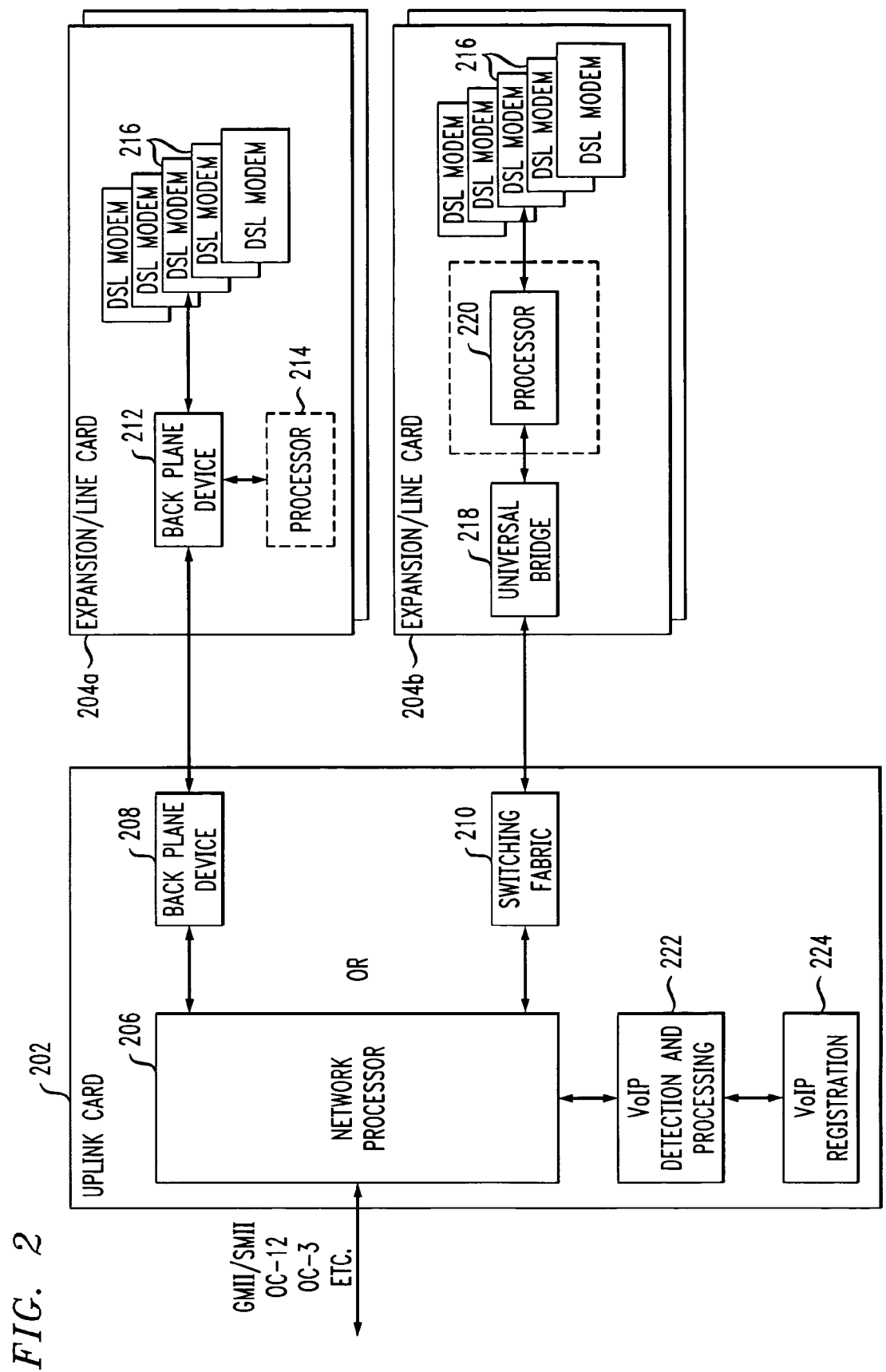
FIG. 2 is a diagram illustrating a DSLAM network node architecture, according to an embodiment of the present invention.

Referring now to FIG. 2, a diagram illustrates a general DSLAM network node architecture, according to an embodiment of the present invention. This may be considered a more detailed view of DSLAM network node 116 of FIG. 1. An uplink card 202 communicates with at least one line card 204a, 204b. In this embodiment, uplink card 202 provides communication with upstream components of the DSLAM network through, for example, gigabit media independent interface (GMII) or serial media independent interface (SMII), through, for example, optical carrier 12 (OC-12, 622.08 Mbps) or optical carrier 3 (OC-3, 155.52 Mbps), at ATM or multi-protocol network processor 206.

Network processor 206 may communicate with a backplane device 208 or a switching fabric 210 within uplink card 202. Uplink card 202 having backplane device 208, and uplink card 202 having switching fabric 210, represent two separate embodiments of the present invention. If backplane device 208 is implemented in uplink card 202, uplink card 202 communicates with one or more line cards 204a, each having a backplane device 212. Backplane device 212 communicates with DSL modems at a residence or business through DSL modems 216 with the optional assistance of a processor 214. The communication through DSL modems allows a telephone at a residence or business to connect to the network and transmit voice packets to network node 116.

If switching fabric 210 is implemented in uplink card 202, uplink card 202 communicates with one or more line cards 204b, each having a universal bridge (UB) 218. Universal bridge 218 may utilize a processor 220 in communicating with DSL modems 216 of line card 204b. DSL modems 216, user modems and telephones perform similar functions in embodiments utilizing line cards 204a and 204b.

A VoIP detection and processing block 222 is in communication with network processor 206 in uplink card 202. VoIP detection and processing block 222 detects both service requests and voice packets sent from a user telephone through a modem and to the network node. A VoIP registration block 224 is in communication with VoIP detection and processing block 222. VoIP registration block 224 recognizes a user through service parameters (SPs) of the detected service requests.

Figure 3:
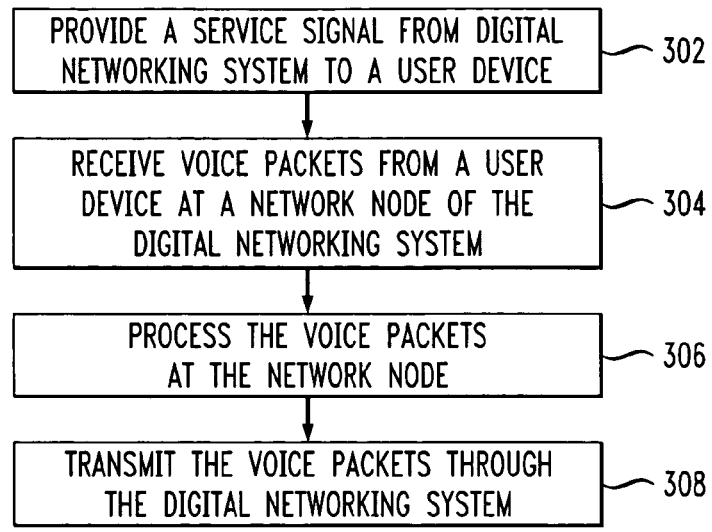
FIG. 3 is a flow diagram illustrating a voice services provision methodology in a broadband network, according to an embodiment of the present invention.

As shown in FIG. 3, a flow diagram illustrates a voice services provision methodology in a digital networking system, according to an embodiment of the present invention. In block 302, a service signal is provided by the digital networking system for a user to communicate over the digital networking system and, more specifically, for the user to make a telephone call. In block 304, voice packets are received from the user device at a network node of the digital networking system. The voice packets may originate at a user's telephone, for example, telephone 128 in FIG. 1, at an endpoint of the digital networking system. The telephone transmits the voice packets through a user's gateway to the network node, for example, through DSL modem 118 to central office 116 of FIG. 1.

In block 306, the voice packets received at the network node are processed in preparation for transmission. During this processing, the voice packets may be prioritized in association with other digital networking traffic handled by the network node. The voice packets are prioritized so that their transmission results in the least delay as compared to other digital networking traffic. Packets determined to be voice packets become high priority packets and are given network priority over less time critical services, such as video and data. The prioritization can occur regardless of the end terminal equipment. Finally, in block 308, the voice packets are transmitted through the digital networking system to a destination defined by the packet processing, thereby enabling user communication.

As described above, the voice packets are received and processed at a network node of the digital networking system. This enables user mobility, or wireless use, in making a telephone call over the network. The user is not confined to a residence or business having a specifically enabled modem or gateway. Instead, since the reception, processing and management of voice data takes place at a network node, the user may roam between different modems or gateways in contacting the digital networking system. This feature may be added to any digital networking system or broadband network, thereby also enabling roaming agreements between different carriers.

Figure 4:
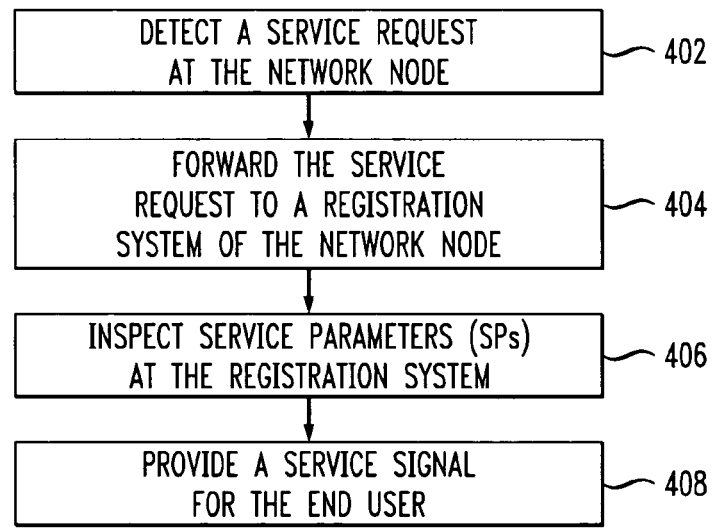
FIG. 4 is a flow diagram illustrating a service signal provision methodology, according to an embodiment of the present invention.

Referring now to FIG. 4, a flow diagram illustrates a service signal provision methodology, according to an embodiment of the present invention. This may be considered a detailed description of block 302 in FIG. 3. In block 402, a service request is detected by the network node of the digital networking system. The service request originates from a user device, for example, a telephone, which seeks to establish communication over the digital networking system. The service request may be commingled with many other services provided by the digital networking system. The service request may be detected by VoIP detection and processing block 222 in FIG. 2. In block 404, the service request is forwarded to a registration system. The registration system is embodied in VoIP registration block 224 of FIG. 2. Service parameters (SPs) of the service request are inspected by the VoIP registration system at block 406, possibly resulting in the recognition of the user and user attributes. User attributes may include, for example, supported voice compression algorithms, and subscriptions to advanced features such as voicemail or fax. In block 408, a service grant is provided by the registration system of the network node, and a signal is provided for the user for communication purposes.

Figure 5:
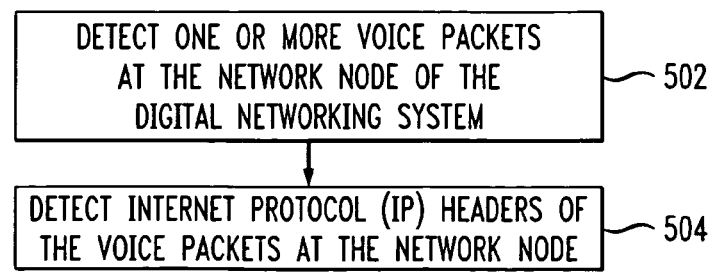
FIG. 5 is a flow diagram illustrating a voice packet reception methodology, according to an embodiment of the present invention.

The flow diagram of FIG. 5 illustrates a voice packet reception methodology, according to an embodiment of the present invention. This may be considered a detailed description of block 304 in FIG. 3. In block 502, one or more voice packets are detected at the network node of the digital networking system. The detection system is embodied in VoIP detection and processing block 222 in FIG. 2. The voice packets originate at a telephone of the user and are transmitted through a modem or gateway of the user for communication with another user. In block 504, Internet protocol (IP) headers of the voice packets are detected at the network node. Again, this detection is embodied in VoIP detection and processing block 222 in FIG. 2. Each IP header may contain, for example, a destination port address, a destination carrier tag, an owner identification, and global positioning system (GPS) location information. Other types of head configurations and information may also be used. The IP header is stored on and sent by the user device, more specifically, telephone 128 of FIG. 1, when the call is placed in the digital networking system. The voice packets are transmitted in association with the destination information found in each IP header.

Accordingly, as described herein, the present invention in the illustrative embodiment provides improved techniques for providing voice subscriber service in a digital network through the recognition and routing of voice packets at a network node of the digital network.

Additional embodiments of the present invention may incorporate various numbers and combinations of network nodes, gateways and user devices. These embodiments may also incorporate different numbers and combinations of line cards and uplink cards in the network nodes, as well as VoIP detection, processing and registration devices within these cards. Finally, the invention is not limited to uplink card-line card configurations in the network node of the illustrative embodiments.

Further, additional embodiments can include a stand-alone box for VoIP prioritization to help retrofit existing networks. The invention may also be easily adapted to meet the requirements for "snooping" by enforcement agencies (Communications Assistance to law Enforcement Act (CALEA) in the U.S.), and to provide the E911 requirements for emergency service notification and prioritization required in the U.S.

As discussed above, the elements of the network node, including the detection and registration device of the present invention may be considered one or more integrated circuit devices. Regarding integrated circuits in general, a plurality of identical die are typically formed in a repeated pattern on a surface of a semiconductor wafer. Each die may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Therefore, although illustrative embodiments of the present invention have been described herein with reference to the accompanying drawings, it is to be understood that the invention is not limited to those precise embodiments, and that various other changes and modifications may be made by one skilled in the art without departing from the scope of the invention as defined by the claims.

What is claimed is:

1. In a network node in a central office of a digital networking system, a method of providing voice services, the method comprising the steps of:

providing a service signal to at least one user device through each of a plurality of gateways, the at least one user device and the plurality of gateways being external to the central office;

receiving one or more voice packets from the at least one user device through at least one of the plurality of gateways;

processing the one or more voice packets; and transmitting the one or more voice packets to one or more destinations determined in the processing step;

wherein the network node in the central office comprises an uplink card, the uplink card comprising a network processor having an associated voice packet detection and processing element;

wherein the network node in the central office further comprises one or more line cards coupled to the uplink card, each of the one or more line cards comprising modem circuitry adapted to communicate with the at least one user device through the at least one of the plurality of gateways, and each of the one or more line cards further comprising at least one of a backplane device and a bridge device, the at least one of the backplane device and the bridge device being coupled to a corresponding device of the uplink card, the uplink card comprising at least one of a backplane device and a switching fabric;

wherein the processing step is implemented in the voice packet detection and processing element of the network node in the central office; and wherein voice packets received from the at least one user device via the modem circuitry of the network node in the central office are detected in the voice packet detection and processing element of the network node in the central office and transmitted to corresponding destinations via the network processor of the network node in the central office.

2. The method of claim 1, wherein the step of providing a service signal to at least one user device comprises the steps of:

detecting a service request from the at least one user device;

forwarding the service request to a registration system of the at least one network node; and providing service on the digital networking system to the at least one user device.

3. The method of claim 2, wherein the step of providing service on the digital networking system comprises the steps of:

determining if the registration system recognizes the at least one user device; and forwarding service grant notification from the registration system when the registration system recognizes the at least one user device.

4. The method of claim 3, wherein the step of determining if the registration system recognizes the at least one user device comprises the steps of:
- inspecting one or more service parameters (SPs) of the service request; and
- recognizing at least one of a user and one or more user attributes from the one or more SPs.

5. The method of claim 1, wherein the step of processing the one or more voice packets comprises the step of detecting at least one Internet protocol (IP) header of the one or more voice packets.

6. The method of claim 5, wherein the at least one IP header is stored and sent by the at least one user device.

7. The method of claim 1, wherein, in the step of transmitting the one or more voice packets, the voice packets are transmitted in accordance with destination information from at least one IP header of the one or more voice packets.

8. The method of claim 7, wherein the at least one IP header comprises one or more of a destination carrier tag, an owner identification, and global positioning system (GPS) location information.

9. The method of claim 1, wherein the step of processing the one or more voice packets comprises the step of prioritizing the one or more voice packets in association with other broadband traffic handled by the at least one network node.

10. The method of claim 9, wherein, in the step of transmitting the one or more voice packets, the one or more voice packets are transmitted in an order determined by the prioritization.

11. The method of claim 9, wherein the step of prioritizing the one or more voice packets results in a shortest delay for voice services compared to the other broadband traffic.

12. The method of claim 1, wherein the network node comprises at least one of a digital subscriber line (DSL) aggregation mux, an Ethernet switch, a broadband loop carrier, and an optical networking unit.

13. An apparatus for providing voice services in a network node in a central office of a digital networking system, the apparatus comprising:
- circuitry for providing a service signal to at least one user device through each of a plurality of gateways, the at least one user device and the plurality of gateways being external to the central office;
- circuitry for receiving one or more voice packets from the at least one user device through at least one of the plurality of gateways;
- circuitry for processing the one or more voice packets; and
- circuitry for transmitting the one or more voice packets to one or more destinations determined by the processing circuitry;
- wherein the network node in the central office comprises modem circuitry and a network processor, the network processor having an associated voice packet detection and processing element;
- wherein the circuitry for providing a service signal and the circuitry for receiving one or more voice packets comprises the modem circuitry of the network node in the central office;
- wherein the circuitry for processing the one or more voice packets comprises the voice packet detection and processing element of the network node in the central office;
- wherein the circuitry for transmitting the one or more voice packets to one or more destinations comprises the network processor of the network node in the central office; and
- wherein voice packets received from the at least one user device via the modem circuitry of the network node in the central office are detected in the voice packet detection and processing element of the network node in the central office and transmitted to corresponding destinations via the network processor of the network node in the central office;
- wherein the network node in the central office comprises an uplink card, the uplink card comprising the network processor and the associated voice packet detection and processing element;
- wherein the network node in the central office further comprises one or more line cards coupled to the uplink card, each of the one or more line cards comprising modem circuitry adapted to communicate with the at least one user device through the at least one of the plurality of gateways, and each of the one or more line cards further comprising at least one of a backplane device and a bridge device, the at least one of the backplane device and the bridge device being coupled to a corresponding device of the uplink card, the uplink card comprising at least one of a backplane device and a switching fabric.

14. The apparatus of claim 13, wherein the circuitry for providing a service signal to at least one user device comprises:
- circuitry for detecting a service request from the at least one user device;
- circuitry for forwarding the service request to a registration system of the at least one network node; and
- circuitry for providing service on the digital networking system to the at least one user device.

15. The apparatus of claim 13, wherein the circuitry for processing the one or more voice packets comprises circuitry for detecting at least one Internet protocol (IP) header of the one or more voice packets.

16. The apparatus of claim 13, wherein the circuitry for processing the one or more voice packets comprises circuitry for prioritizing the one or more voice packets in association with other broadband traffic handled by the at least one network node.

17. A network node in a central office of a digital networking system, the network node in the central office comprising an uplink card, the uplink card comprising an integrated circuit device, wherein the integrated circuit device is configured to provide a service signal to at least one user device through each of a plurality of gateways, the at least one user device and the plurality of gateways being external to the central office, receive one or more voice packets from the at least one user device through at least one of the plurality of gateways, process the one or more voice packets, and transmit the one or more voice packets through the digital networking system to one or more destinations determined in the processing operation;
- wherein the integrated circuit device comprises a network processor having an associated voice packet detection and processing element;
- wherein the network node in the central office further comprises one or more line cards coupled to the uplink card, each of the one or more line cards comprising modem circuitry adapted to communicate with the at least one user device through the at least one of the plurality of gateways, and each of the one or more line cards further comprising at least one of a backplane device and a bridge device, the at least one of the backplane device and the bridge device being coupled to a corresponding device of the uplink card, the uplink card comprising at least one of a backplane device and a switching fabric; and wherein voice packets received from the at least one user device via the modem circuitry of the network node in the central office are detected in the voice packet detection and processing element of the network node in the central office and transmitted to corresponding destinations via the network processor of the network node in the central office.

18. The network node of claim 17, wherein the integrated circuit device is further configured to detect a service request from the at least one user device, and provide service on the digital networking system to the at least one user device.

19. The network node of claim 17, wherein the integrated circuit device is further configured to detect at least one Internet protocol (IP) header of the one or more voice packets.

20. The network node of claim 17, wherein the integrated circuit device is further configured to prioritize the one or more voice packets in association with other broadband traffic handled by the network node.

21. The network node of claim 20, wherein the prioritization of the one or more voice packets results in a shortest delay for voice services compared to the other broadband traffic.

22. The network node of claim 21, wherein the integrated circuit device is configured to inspect one or more service parameters (SPs) of a service request, and recognize at least one of a user and one or more user attributes from the one or more SPs.

23. A digital networking system comprising:
  at least one user device configured to transmit one or more voice packets; and
  a central office comprising at least one network node, the at least one network node comprising an integrated circuit device configured to provide a service signal to at least one user device through each of a plurality of gateways, the at least one user device and the plurality of gateways being external to the central office, receive one or more voice packets from the at least one user device through at least one of the plurality of gateways, process the one or more voice packets, and transmit the one or more voice packets through the digital networking system to one or more destinations determined in the processing operation;
  wherein the network node in the central office comprises an uplink card, the uplink card comprising a network processor having an associated voice packet detection and processing element;
  wherein the network node in the central office further comprises one or more line cards coupled to the uplink card, each of the one or more line cards comprising modem circuitry adapted to communicate with the at least one user device through the at least one of the plurality of gateways, and each of the one or more line cards further comprising at least one of a backplane device and a bridge device, the at least one of the backplane device and the bridge device being coupled to a corresponding device of the uplink card, the uplink card comprising at least one of a backplane device and a switching fabric; and
  wherein voice packets received from the at least one user device via the modem circuitry of the network node in the central office are detected in the voice packet detection and processing element of the network node in the central office and transmitted to corresponding destinations via the network processor of the network node in the central office.

\* \* \* \* \*